United States Patent

Graber

[11] 4,182,467
[45] * Jan. 8, 1980

[54] VEHICLE ATTACHED CARRIER

[76] Inventor: Joseph V. Graber, 3739 County Trunk M, Middleton, Wis. 53562

[*] Notice: The portion of the term of this patent subsequent to Apr. 25, 1995, has been disclaimed.

[21] Appl. No.: 821,086

[22] Filed: Aug. 2, 1977

Related U.S. Application Data

[63] Continuation-in-part of Ser. No. 646,175, Jan. 2, 1976, Pat. No. 4,085,784.

[51] Int. Cl.² .............................................. B60R 9/10
[52] U.S. Cl. ............................... 224/309; 224/42.03 B
[58] Field of Search ....... 224/29 R, 42.03 R, 42.03 A, 224/42.03 B, 42.06, 42.07, 42.1 E, 42.45 R; 211/17, 18, 22, 81; 108/44, 45, 46; D12/157, 158; 248/238

[56] References Cited

U.S. PATENT DOCUMENTS

| | | | |
|---|---|---|---|
| 3,710,999 | 1/1973 | Allen | 224/42.03 B |
| 3,712,522 | 1/1973 | Penniman | 224/29 R |
| 3,874,575 | 4/1975 | Wasserman | 224/42.07 X |
| 3,921,869 | 11/1975 | Rogers | 224/42.03 B |
| 3,927,810 | 12/1975 | Danon | 224/42.03 B X |
| 3,927,811 | 12/1975 | Nussbaum | 224/42.03 B |

*Primary Examiner*—Trygve M. Blix
*Assistant Examiner*—Winston H. Douglas
*Attorney, Agent, or Firm*—Morsbach & Pillote

[57] ABSTRACT

A vehicle attached carrier for bicycles comprising spaced U-shaped side frames each formed with an arcuate intermediate portion and two straight leg portions extending from the ends of the arcuate intermediate portion, the side frames having a plurality of openings spaced apart along the arcuate intermediate portion in non-linear relation; and bicycle support frame including relatively parallel support arms having spaced openings adapted to register with different selected pairs of openings in the arcuate intermediate portion of the side frames to receive bolts for securing the arms to the side frames in different selected positions extending generally chordwise of the arcuate intermediate portion of the side frames.

5 Claims, 5 Drawing Figures

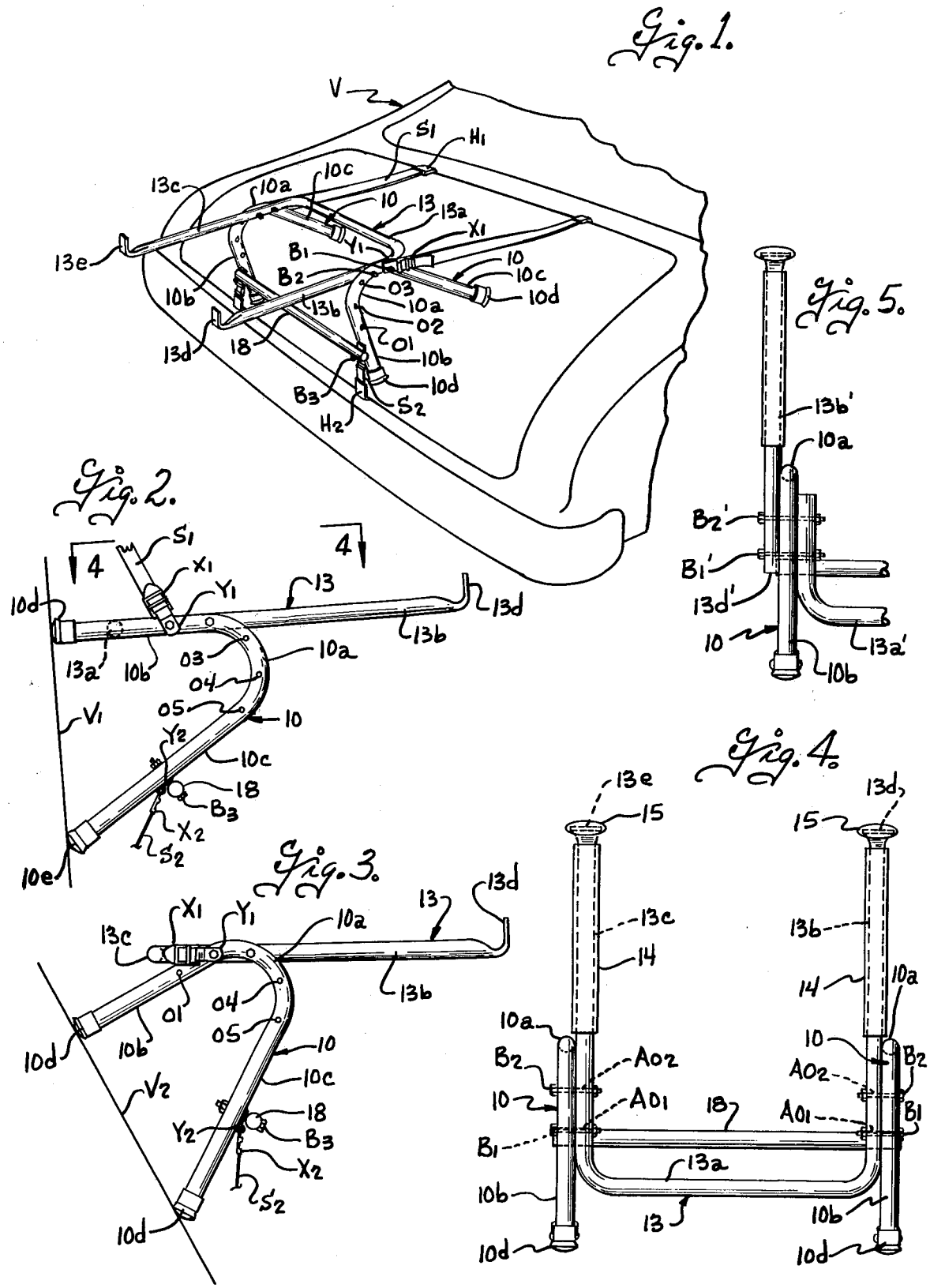

VEHICLE ATTACHED CARRIER

RELATED APPLICATIONS

This application is a continuation-in-part of my copending application, Ser. No. 646,175, filed Jan. 2, 1976, now U.S. Pat. No. 4,085,784, issued Apr. 25, 1978.

BACKGROUND OF THE INVENTION

Automobile bicycle carriers have heretofore been made which support a bicycle at the rear of a vehicle with the bicycle extending generally crosswise of the vehicle. A common form of bicycle carrier has laterally spaced elongated frame members supported at their lower ends on the vehicle bumper to extend generally upright and laterally spaced bicycle support arms extending generally horizontally from the upper ends of the frame members for engaging and supporting one or more bicycles. It is not always convenient or possible to support the bicycle carrier on the bumper, and it has also been proposed to support the bicycle carrier by feet or pads on the rear portion of the vehicle body, for example as shown in U.S. Pat. Nos. 3,710,999; 3,921,869, 3,927,810 and 3,927,811. The shape and slope of the rear portions of the vehicle bodies on which the carriers are supported varies widely in different vehicles and, notwithstanding the number and variety of such prior bicycle carriers, there remained a need for a body mounted automobile bicycle carrier of simple and economical construction and which could be readily and easily adjusted for mounting on different vehicles to support bicycles in a generally upright position extending crosswise of the rear of the vehicle.

SUMMARY OF THE INVENTION

The present invention relates to improvements in the body mounted automobile bicycle carrier disclosed in my copending application, Ser. No. 646,175, filed Jan. 2, 1976. The body mounted bicycle carrier in that application included a pair of U-shaped side frames having resilient vehicle engaging feet to support the carrier on the body of the vehicle and a pair of bicycle support arms mounted on the side frames for angular adjustment relative thereto through a wide range to enable the bicycle support arms to extend generally horizontally for supporting the bicycle when the side frames are disposed in different positions on different vehicles.

Various objects of the present invention are to provide a body mounted automobile bicycle carrier which is adapted for mounting on the rear body portion of vehicles of widely different designs including station wagons, hatch backs, sedans, and automobiles with horizontal wind fins; which does not interfere with the opening of trunk lids when mounted thereon and which swings out of the way when the trunk lid is opened; which has bicycle support arms that are adjustable relative to the vehicle engaging side frames through a wide range to enable the arms to project generally horizontal in cantilever fashion from the side frames when the latter are mounted at various different positions on different vehicle bodies to support bicycles in a generally upright condition at the rear of the vehicle, and which bicycle carrier is of compact design and utilizes relatively few parts that can be economically formed and assembled, and which is stable and reliable in use.

Accordingly, the present invention provides an automobile bicycle carrier comprising a pair of relatively parallel U-shaped side frames each formed of one piece tubular stock and having an arcuate intermediate portion and two straight leg portions integral with the ends of the respective intermediate portion and diverging therefrom at an acute angle along lines generally tangent to the ends of the arcuate intermediate portion, the leg portions having means providing resilient vehicle engaging feet adjacent the free ends thereof and the side frames each having a plurality of openings therethrough perpendicular to the plane of the respective side frame and at locations spaced apart along the arcuate intermediate portions of the side frames in non-linear relation and such that lines extending chordwise of the arcuate intermediate portions between different selected pairs of the openings in each side frame are disposed in at least several different planes relative to a plane through the vehicle engaging feet, bicycle support frame including a pair of arms each adapted to be disposed in a plurality of different positions extending alongside the arcuate intermediate portion of the respective side frame and generally chordwise thereof. The arms each have spaced openings therethrough spaced apart a distance to register with different selected pairs of said plurality of openings in the selected side frame in different ones of said plurality of different portions, and bolts adapted to extend through two spaced openings in each of the arms and through a pair of registering openings in the respective side frame for attaching the arms of the bicycle support frame to the arcuate intermediate portion of the side frames in selected ones of said plurality of different positions with the arms projecting in cantilever fashion outwardly from the arcuate intermediate portion of the side frames at different angles to a plane through the vehicle engaging feet, and strap means for attaching the carrier to a vehicle with the vehicle engaging feet resting on the vehicle body.

The bicycle support arms can be swung out of the way when not in use and the bicycle support frame can be disassembled from the side frames for compact storage and transportation.

These, together with other objects and advantages of this invention will be more readily understood by reference to the following detailed description when taken in connection with the accompanying drawings wherein:

FIG. 1 is a fragmentary perspective view of a vehicle having the bicycle carrier of the present invention mounted thereon;

FIG. 2 is a side elevational view of the bicycle carrier illustrating its mounting on one type of vehicle;

FIG. 3 is a side elevational view of the bicycle carrier illustrating its mounting on a vehicle of different body styles;

FIG. 4 is a plan view of the carrier shown in FIG. 2; and

FIG. 5 is a plan view of a modified form of carrier.

The bicycle carrier of the present invention is arranged to support one or more bicycles at the rear of a vehicle V and is adapted for use on vehicles of widely different body shape and design including sedans, hatchbacks and station wagons. The bicycle carrier in general includes a pair of rigid generally U-shaped side frames 10 disposed in relatively parallel plane and a generally U-shaped bicycle support frame 13 which is mounted on and interconnects the side frames. The side frames 10 are each formed of one piece tubular stock which is bent intermediate its ends to provide an arcuate intermediate portion 10a and two straight leg portions, 10b and 10c that are integral with the ends of the respective arcuate intermediate portion 10a, and which diverge therefrom at an acute angle along lines generally tangent to the ends of the arcuate intermediate portion. Resilient vehicle engaging feet 10d are provided on the free ends of the leg portions of the side frames 10 and the vehicle engaging feet are herein shown in the form of resilient caps telescoped on the ends of the tubular leg portions of the side frames, with a means such as a rigid washer (not shown) provided in the bottom of the socket portion of the caps to prevent the ends of the tubular members from cutting through the resilient caps. The leg portions 10b and 10c of the side frames diverge at an acute angle relative to each other, preferably the order of 30° to 40° so that the vehicle engaging feet are spaced apart relatively wider than the span of the arcuate intermediate portions of the respective side frames. In the preferred embodiments illustrated, the spacing between the vehicle engaging feet on each side frame is about eleven inches and is approximately the same as the spacing between the plane of the vehicle engaging feet and the apex of the arcuate intermediate portion of the side frame. For reasons pointed out more fully hereinafter, one of the leg portions 10b of each of the side frames 10 extend generally perpendicular to a plane through the vehicle engaging feet. The other leg portions 10c of the side frames are disposed at an acute angle, preferably about 50° to 60°, relative to the plane through the vehicle engaging feet.

The bicycle support frame 13 includes a pair of arms designated 13b and 13c and a cross member 13a. In the embodiment of FIGS. 1-4, the support frame is formed of one piece tubular stock which is bent to form a generally U-shaped frame including an elongated intermediate portion providing the cross member 13a with the arms 13b and 13c extending laterally from opposite ends of the intermediate portion in relatively parallel relation. The arms 13b and 13c are preferably bent upwardly at their outer ends as indicated at 13d and 13e to provide bicycle stops at the outer ends of the arms. In order to minimize marring of the finish on the bicycles, the bicycle support arms 13b and 13c are prefarably covered or coated with a resilient covering of plastic, rubber or the like, indicated at 14 in FIG. 4 and, similarly, the stops 13d and 13e are also preferably covered with a resilient coating or cap indicated at 15 in FIG. 4. In the embodiment of FIG. 5, the arms designated 13b' are formed separate from the cross member 13a', and the cross member 13a' has lateral end portions 13d'.

The side frames 10 are each formed with a plurality of openings, herein shown five in number and designated O1-O5, which openings extend through the side frames perpendicular to the plane of the respective side frame and at locations spaced apart along the arcuate intermediate portions 10a of the side frames in non-linear relation and such that lines extending chordwise between different selected pairs of the openings in the side frames are disposed in at least several different planes relative to a plane through the vehicle engaging feet.

The arms 13b and 13c of the bicycle support frame are adapted to be disposed in a plurality of different positions extending alongside the arcuate intermediate portion of the respective side frame generally chordwise thereof and the arms are each formed with spaced openings at the ends adjacent the cross member 13a, which openings extend parallel to the plane of the bicycle support frame and are spaced apart a distance to register with different selected pairs of the openings O1-O5 in the side frames. These openings, designated AO1 and AO2 in FIG. 4, are concealed by the bolts B1 and B2 in the other views of the drawings, but it is to be understood that the spacing between the openings AO1 and AO2 in the arm portions of the bicycle support frame is made equal to the spacing between selected pairs of the openings O1-O5 in the side frames. In order to enable the bicycle support arms 13b and 13c to extend generally horizontally when the side frames are mounted on a vehicle having a generally upright rear body portion designated V1, as shown in FIG. 2, one pair of the openings O1 and O2 are provided in each of the side frames at locations aligned with the axis of the leg portions 10b that extend generally perpendicular to a plane through the vehicle engaging feet. Thus, as will be seen from FIGS. 2 and 3, one of the openings O2 is located adjacent the juncture of the arcuate intermediate portions 10a with the respective leg portion 10b, and the other opening O1 is spaced along the respective leg portions a preselected distance corresponding to spacing between the openings in AO1 and AO2 in the arm portions. Thus, the bolts designated B1 and B2 can be inserted through the two spaced openings AO1 and AO2 in the arm portions and through registering openings such as O1 and O2 in the respective side frames, to secure the arm portions to the side frames in a position with the arm portions extending generally perpendicular to a plane to the vehicle engaging feet. It is understood of course that the bolts have the usual nuts and lock washer and that the nuts can be thumb nuts if desired. The spacing between the openings O2 and O3 measured along a chord between the openings is made the same as the spacing between the openings AO1 and AO2 so that the arm portions can be attached to the respective side frame by inserting bolts through the arm portions and through openings O2 and O3 in the side frames as shown in FIG. 3, to thereby support the arm portions on the side frames at an angle extending about 60° to a plane through the vehicle engaging feet indicated by the letter V2 in FIG. 3. In this manner, the carrier can be supported on the vehicle body disposed at a relatively steep angle, for example about 60° to the horizontal, as occurs in some body styles such as fastbacks. Similarly, the spacing between the openings O4 and O5 measured along the cord extending between those openings, is made equal to the spacing of the openings AO1 and AO2 in the arm portions so that the arm portions can be attached to the side frames by extending the bolts B1 and B2 through the openings O5 and O4, as shown in FIG. 1, so that the arm portions extend rearwardly in a generally horizontal direction from the side frames, when the carrier is mounted on a body surface with the legs disposed at a relatively shallow angle, for example of the order of 30° to the horizontal. Obviously additional openings could be provided in the arcuate intermediate portion of the side frames and/or in the arm portions of the bicycle support frames and arranged to register still other angular positions of the arm portions relative to the side frames, if it is desired to adjust the arms to still further positions.

The U-shaped bicycle support frame 13 is thus rigidly secured to and extends between the side frames 10 to rigidly interconnect the same. One additional cross brace 18 is preferably provided between the side frames at a location spaced from the arcuate intermediate portions of the side frames. Preferably, the carrier is arranged so that the cross member 18 can be attached to either the legs 10b as shown in FIG. 1 or to the legs 10c as shown in FIGS. 2-4. For this purpose, each of the legs of the side frames are formed with a transverse opening therethrough (not shown) which generally parallels the plane of the respective side frame, and the ends of the cross member 18 are similarly provided with transverse openings (not shown) which are adapted to receive bolts B3 for securing the cross member to either the legs 10b or to the legs 10c. Since the cross member 13a on the bicycle support frame 13 extends between the side frames adjacent the upper portion of the frame, the cross member 18 is preferably attached to those legs which extend downwardly when mounted on the vehicle.

In the embodiment of FIG. 5 in which the cross member 13a' is formed separate from the arms, the arms 13b' and the lateral end portions 13d" of the cross member are disposed at relatively opposite sides of the arcuate intermediate portion 10a of the side frame and relatively longer bolts B1' and B2' are provided to extend through spaced openings in the arms and the end portions 13d" of the cross member and through selected pairs of the openings O1–O5 in the arcuate intermediate portion of the side frames. As will be apparent, the end portions 13d" of the cross member 13a' can be arranged to project either rearwardly as shown in FIG. 5, or forwardly if desired.

The bicycle carrier is attached to the vehicle as by pairs of straps S1. Straps S1 have hooks H1 at one end adapted to engage part of the vehicle body such as the edge of a trunk lid, the drain bead or the like, and the straps are connected at the other end by buckles X1 to the bicycle carrier. The buckles X1 are conveniently secured as by brackets Y1 to the bicycle carrier by one of the bolts such as B1 used for securing the bicycle support frame to the side frames. The other straps S2 are provided with hooks H2 on one end adapted to engage a part of the vehicle such as the edge of the trunk lid or the bumper, and the straps S2 are similarly connected by buckles X2 to the carrier at a location spaced from the buckles X1. As shown, the buckles X2 are secured by hangers Y2 to the bicycle carrier by the bolts B3 used for securing the cross member 18 to the side frames.

From the foregoing it is thought that the construction and use of the bicycle carrier will be readily understood. The vehicle engaging feet 10d are adapted to rest on the body of the vehicle such as the trunk deck, back of a station wagon or the like. The side frames provide a deep clearance space between the legs and under the arcuate intermediate portion so that the side frames can pass around abrupt changes in body contour and even over horizontal wind fins that are provided on some cars. The angle of the plane of the vehicle engaging feet to the horizontal will vary widely in different vehicles, depending on the contour of the vehicles in the rear body area where the carrier is mounted, and the bicycle support frame can be mounted chordwise on the arcuate intermediate portion of the side frames in different angular positions so as to extend generally horizontally when the carrier is mounted on different vehicles. This enables the bicycles to be mounted on the support members with the bicycle frames resting on the support members and the bicycle positioned generally upright so that the bicycles are not pressed against the side frames of the carrier or against an adjacent bicycle when more than one bicycle is mounted on the carrier, to thereby minimize damage to a bicycle during transportation. When mounted on a vehicle, the arms project rearwardly from the arcuate intermediate portion of the side frames in cantilever fashion and the legs of the side frames do not interfere with vertical suspension of the bicycles from the support arms. The carrier is compact and, when mounted even on the small trunk lids of compact size vehicles, it does not have to be removed in order to enable opening of the trunk lid. Thus, when the trunk lid is opened, the carrier swings out of the way with the trunk lid.

Straps (not shown) can be used to tie the bicycles to the rack and/or vehicle. Since the U-shaped bicycle support frame is connected to each of the side frames at two spaced locations, the bicycle carrier is both laterally and vertically stable and rigid. Moreover, the carrier utilizes a minimum of parts and essentially requires only two U-shaped side frames which can be easily formed in a single bending operation, a pair of bicycle support arms, and at least one cross member, together with the bolts and straps for securing the frames to each other and to the vehicle. Moreover, the bicycle support arms can be swung in an inoperative or out-of-the-way position by merely loosening a pair of the bolts and the carrier can be disassembled for storage and transporation in a flat condition if desired.

The embodiments of the invention in which an exclusive property or privilege is claimed are defined as follows:

1. A vehicle attached carrier comprising:
   (a) a pair of rigid generally U-shaped side frames disposed in relatively parallel planes, said side frames each being of one-piece stock and having an arcuate intermediate portion and two straight leg portions integral with the ends of the respective arcuate intermediate portion and diverging therefrom at an acute angle along lines generally tangent to the ends of the arcuate intermediate portion whereby the spacing between the leg portions of each side frame is substantially greater at the free ends thereof than adjacent the respective arcuate intermediate portion, means connected to the leg portions providing resilient vehicle engaging feet at the free ends thereof, the legs of each of said U-shaped side frames extending at relatively different angles to a plane through the vehicle engaging feet, said side frames each having a plurality of openings therethrough perpendicular to the plane of the respective side frame and at locations spaced apart along the arcuate intermediate portion of the side frames in non-linear relation and such that lines extending chordwise of the arcuate intermediate portion between different selected pairs of the openings in each side frame are disposed in at least several different planes relative to a plane through the vehicle engaging feet,
   (b) a support frame including a pair of elongated arms, said arms being adapted to be disposed in a plurality of different positions extending alongside the arcuate intermediate portion of a respective one of the side frames and generally chordwise thereof, said arms each having spaced openings therethrough and spaced apart a distance to register with different selected pairs of said plurality of openings in a respective side frame in different ones of said plurality of different positions to enable mounting of the arms on the arcuate intermediate portions of the side frames with the arms extending generally horizontally outwardly in cantilever fashion adjacent the part of the arcuate intermediate portion of the respective side frame that is uppermost when the vehicle engaging feet are disposed in different vertically inclined planes,
(c) bolts adapted to extend through two spaced openings in each of the arms and through a pair of registering openings in the arcuate intermediate portion of the respective side frame for attaching the arms to the arcuate intermediate portion of the side frames in selected ones of said plurality of different positions with the arms extending chordwise of the arcuate intermediate portion of the side frames at different angles to a plane through the vehicle engaging feet,
(d) at least one cross member connected to the side frames and extending therebetween, and
(e) strap means for attaching the carrier to a vehicle with the vehicle engaging feet resting on the vehicle body.

2. A vehicle attached carrier according to claim 1 wherein one leg of each of said U-shaped side frames extends generally perpendicular to a plane through said vehicle engaging feet and the other leg of each side frame extends at an acute angle to the plane through the vehicle engaging feet.

3. A vehicle attached carrier according to claim 1 wherein one leg of each of said U-shaped side frames extends generally perpendicular to a plane through said vehicle engaging feet and the other leg extends at an acute angle of about 50° to 60° to the plane through the vehicle engaging feet.

4. A vehicle attached carrier according to claim 1 including at least one other cross member attached to one leg of each of said frames and extending between the side frames at a location spaced from said arcuate intermediate portions of the side frames.

5. An automobile bicycle carrier according to claim 1 including a strap attaching bracket attached to each of said side frames by one of the bolts that attach the arm portions of the bicycle support frame to the arcuate intermediate portions of the respective side frames.

* * * * *